United States Patent [19]
Schmit

[11] 3,737,749
[45] June 5, 1973

[54] MOTOR CONTROL SYSTEM
[75] Inventor: Theodore F. Schmit, Chicago, Ill.
[73] Assignee: Electronic Flag Poles, Inc., Maywood, Ill.
[22] Filed: June 16, 1972
[21] Appl. No.: 263,458

[52] U.S. Cl.................318/472, 116/173, 317/12 R
[51] Int. Cl.................................................G05b 9/02
[58] Field of Search.....................318/286, DIG. 2, 318/471, 472, 476; 317/12 R; 116/173

[56] References Cited
UNITED STATES PATENTS

| | | | |
|---|---|---|---|
| 3,090,900 | 5/1963 | Porter et al. | 318/476 |
| 3,588,652 | 6/1971 | Lewis | 318/286 |
| 3,418,967 | 11/1968 | Donkersloot | 116/173 |
| 3,206,117 | 9/1965 | Anderson et al. | 318/286 X |

Primary Examiner—B. Dobeck
Attorney—James A. Davis, William E. Lucas, F. Thrall Brewer et al.

[57] ABSTRACT

A system for controlling the operation of a reversible electric motor employed in raising and lowering a flag in an automatic flagpole, including thermally responsive current-sensing switching devices and an electromagnetic relay means in a circuit with the motor and arranged to reverse the motor's direction in response to a predetermined overloading due to obstruction to the free movement of the flag-carrying halyard driven by the motor and to restart the motor in its original direction of rotation after a predetermined time delay.

5 Claims, 5 Drawing Figures

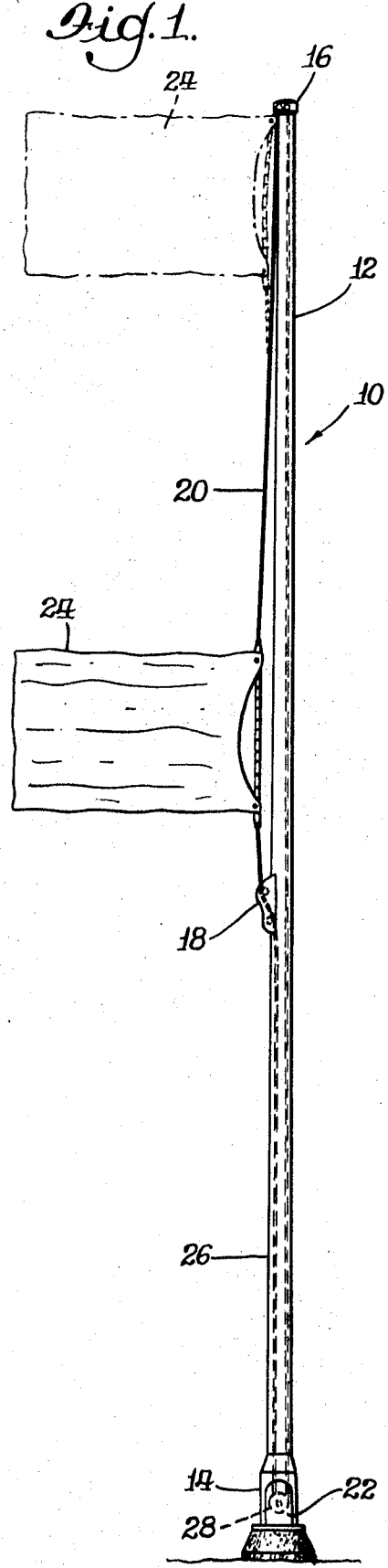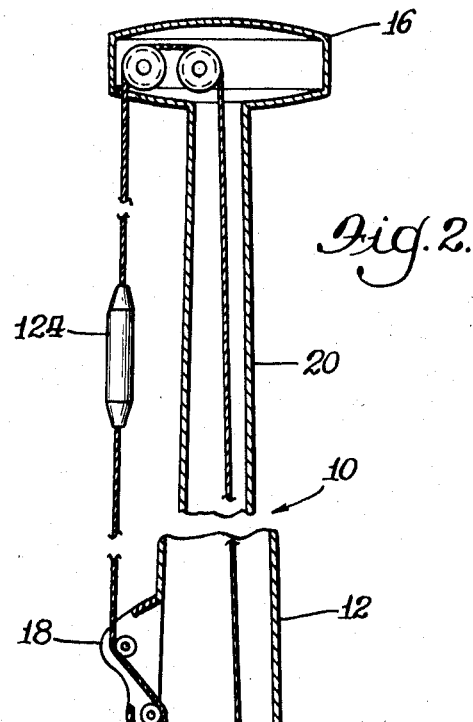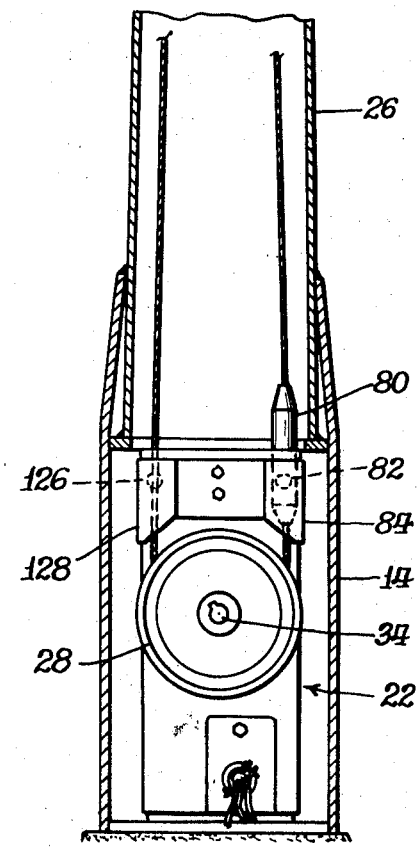

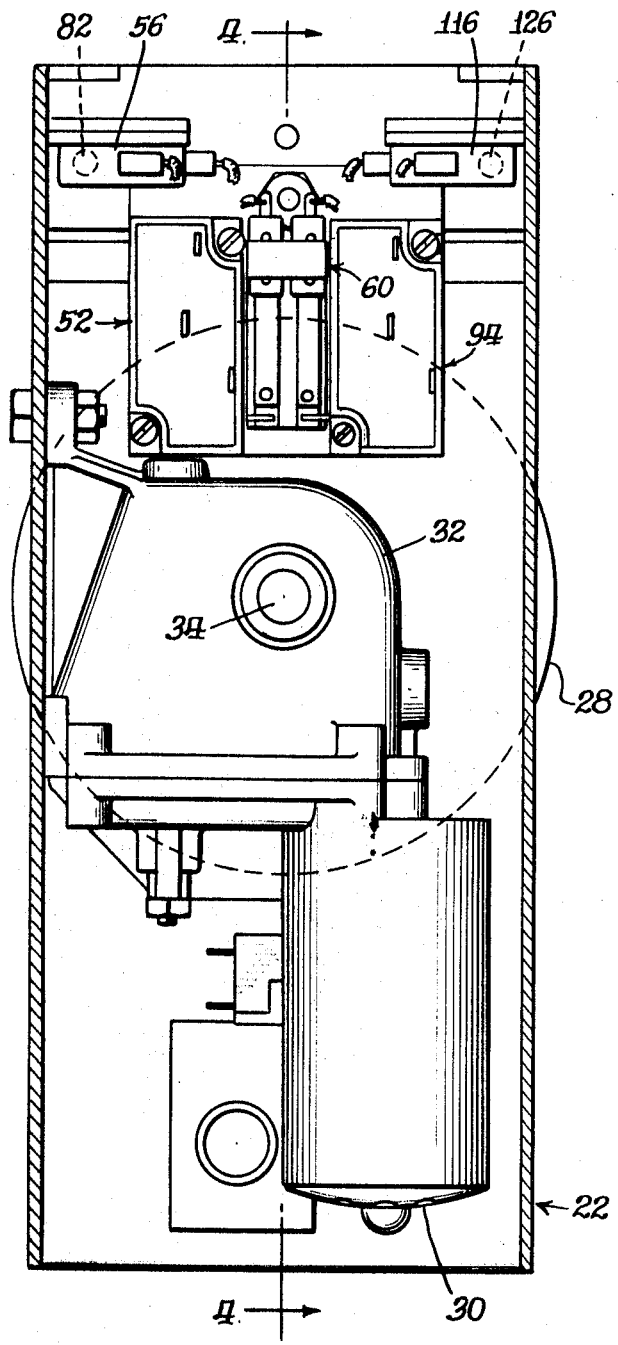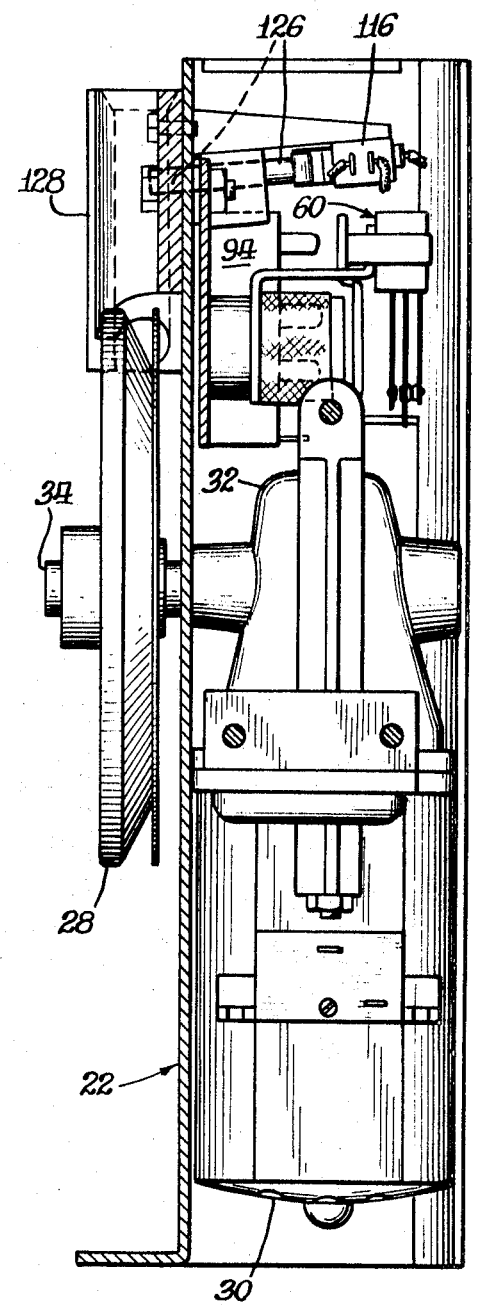

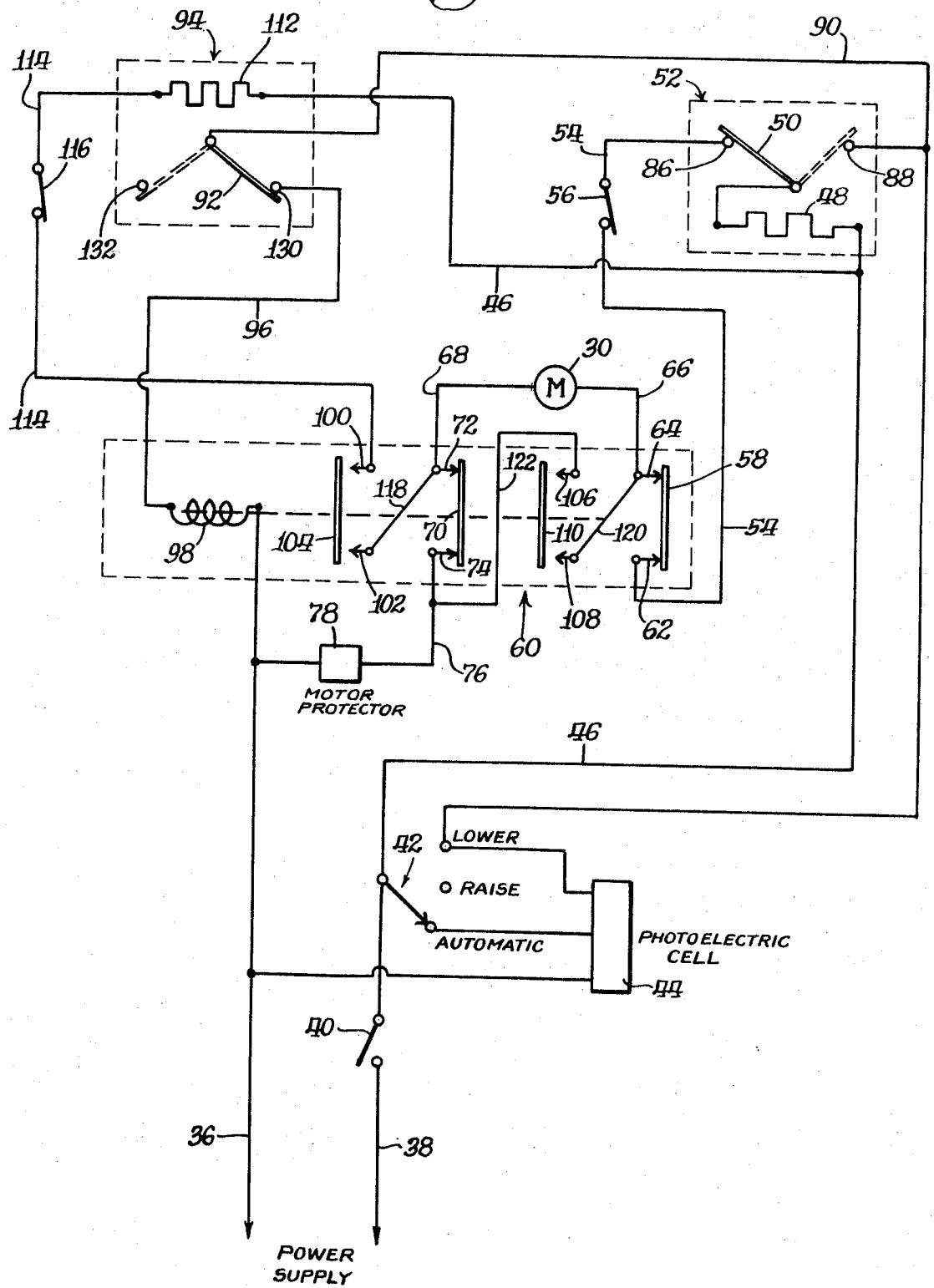

3,737,749

MOTOR CONTROL SYSTEM

BACKGROUND OF THE INVENTION

This invention relates generally to control systems for electric motors and more specifically to improved means for automatically reversing the direction of rotation of a reversible electric motor.

The present invention has particular utility in situations requiring a reversible drive motor which periodically is subjected to overloading of the system driven thereby. It is specifically adapted for utilization in an automatic flagpole assembly of the order described in U. S. Pat. No. 3,418,967, issued Nov. 31, 1968, and embodying means for automatically raising and lowering a flag between the peak of the flagpole and an internal storage compartment by means of an electric motor drive coupled to the flag-carrying halyard.

In the day-to-day operation of a flagpole assembly in accordance with the afore-noted U.S. Pat. No. 3,418,967, the intervention of a human agent is required from time to time in order to insure successful operation. For example, on occasion the flag may become entangled with the halyard cable, particularly within the storage compartment of the flagpole, or in freezing weather a wet flag often times freezes in a rigid condition preventing its easy entry and exit into and out of the storage compartment. In such eventualities, energization of the drive means for moving the cable halyard usually produces an electrical overload of the drive motor because of the flag's obstruction to free movement of the cable or halyard. When this occurs, the usual motor protective device operates to de-energize the entire system, thereby requiring a human attendant to reset the motor overload protector circuit and remove the obstruction to the halyard movement.

SUMMARY OF THE INVENTION

In view of the above outlined difficulties, need has arisen for an improved system for automatically removing obstructions to the movement of the flag-carrying halyard while protecting the drive motor without the need of human intervention.

This invention is directed to just such a means and, while the same will be disclosed and described in association with its adaptation for the above-noted automatic flagpole situation, it is not so limited in its fields of use or operation.

In brief, the present invention embodies an improved motor protective control system for use with reversible electric drive motors. In essence, upon obstruction to the driven means, thermally responsive means in the motor circuit operates to reverse the drive motor, thus also reversing the movement of the means driven thereby. After a suitable time delay, the motor means is again reversed, and the reversing cycle is repeated until the obstruction to the driven means is successfully removed or overcome. Meanwhile, the repeated automatic reversals of the drive motor and the intervening time delays protect the motor while preventing a conventional electrical overload protective device associated therewith from automatically operating to shut down the entire electrical system under normal circumstances.

An important object of this invention is to provide improved control means for effectuating the automatic reversal of a reversible drive motor in the presence of obstruction to the free operational movement of the means driven thereby.

Another object of this invention is to provide a motor actuated drive system for automatically raising and lowering a flag, or the like, utilizing an improved motor protective control circuit.

A further object of this invention is to provide a motor control system which will automatically reverse the direction of a reversible electric drive motor in response to a predetermined overload caused by an obstruction to the free operational movement of the means driven thereby, restart the motor in its original direction of rotation after a predetermined time delay, and repeat this reversing cycle until the obstruction is successfully removed and overcome.

Still another important object of this invention is to provide a motor actuated drive system adapted for use in an automatic flagpole assembly which will automatically reverse the direction of movement of the flag-carrying halyard when the flag encounters an obstruction in moving into or out of its protective compartment and, after a suitable time delay, restore the movement of the halyard to its original direction, and repeat this reversing cycle until the obstruction is successfully removed or overcome.

Still a further object of this invention is to provide a motor control system for a reversible electric motor which, when the motor encounters a mechanical overload, will automatically effectuate one or more cycles of reversing the direction of the motor and restoring the motor to its original direction of rotation after a suitable time delay during which time the mechanical overload is removed or overcome in order to prevent a conventional electrical overload protective device in the motor supply circuit from automatically operating to shut down the entire electrical system, thereby eliminating the need for periodic human assistance to remove the condition causing the overload and manually restart the motor in its original direction of rotation.

Having thus described the present invention, the best mode presently contemplated for carrying out its features and concepts so as to enable those skilled in the art to practice the same will now be described in association with the embodiment thereof illustrated in the accompanying drawings, in which:

FIG. 1 is a front elevational view of a flagpole assembly embodying this invention;

FIG. 2 is an enlarged partial sectional view of portions of the flagpole assembly shown in FIG. 1;

FIG. 3 is an enlarged partial sectional view illustrating the rear of the base end of the flagpole assembly shown in FIGS. 1 and 2;

FIG. 4 is an enlarged partial sectional view taken substantially along vantage line 4—4 of FIG. 3, and looking in the direction of the arrows thereon; and FIG. 5 is a schematic circuit diagram illustrating a control system according to this invention and adopted for use in the aforementioned flagpole assembly.

DESCRIPTION OF THE PREFERRED EMBODIMENT

Turning now to the embodiment of the present invention illustrated in the accompanying drawings, reference is initially made to FIGS. 1 and 2. As shown therein, an upright or vertical flagpole assembly 10 comprises a tubular means 12 supported at its lower end by a ground anchored base 14. A truck assembly 16 is mounted at the upper peak end of the flagpole, and flag furling and guiding means 18 are provided substantially at the midpoint thereof. A flag-mounting halyard 20 comprising an endless cable is trained between the truck assembly 16 and a power drive means 22 mounted within the hollow interior of the base 14. The halyard carries a flag 24 and passes through the flag furling and guiding means 18 and along the holow interior of a protective flag compartment 26 comprising a portion of the tubular means 12 between the flag furling and guiding means 18 and the base 14. Movement of the halyard is effected periodically by the power drive means 22 which reversibly drives a sheave wheel 28.

FIGS. 3 and 4 illustrate the power drive means 22, which is mounted within the base 24. A reversible electric motor 30 and a gear assembly 32 of said power drive means reversibly drive sheave wheel 28 by means of shaft 34 in accordance with selectively operable manual or automatic control means of this invention. The automatic control means may include climatic responsive devices such as light, wind and precipitation responsive means whereby the flag may be automatically raised and lowered according to varying climatic conditions. One such control means, according to the present invention, is schematically illustrated in FIG. 5.

As shown in that figure, the reversible electric motor 30 is energized by a two conductor power supply circuit comprising conductors 36 and 38, typically energized with 120 volt, 60 cycle AC power through master control switch 40. A manually actuated three pole selector switch 42 is set to either the "raise" or "lower" or "automatic" position, the latter employing automatic climatic control means, such as a light-responsive photoelectric cell 44 illustrated, to automatically raise or lower the flag normally at sunrise and sunset.

The operation of the motor control system for various conditions will now be described. Closing master control switch 40 with selector switch 42 in the "raise" position, or with said selector switch in the "automatic" position and the photoelectric cell operating to raise the flag, will cause the motor 30 to rotate in a clockwise direction as viewed in FIG. 2, by completing the motor supply circuit over conductor 46, current-sensitive heater means 48 and movable contact 50 of current-sensing switching device 52, conductor 54, closed upper-limit microswitch 56, movable relay contact 58 which, under the de-energized condition of an electromagnetic relay 60, bridges relay contacts 62 and 64, conductor 66, conductor 68, movable relay contact 70 which, under the de-energized condition of electromagnetic relay 60 bridges relay contacts 72 and 74, conductor 76, motor protector device 78, and conductor 36. The upper-limit microswitch 56 is designed to be opened in response to periodic engagement with an actuating lug 80 (FIG. 2) adjustably carried on the halyard 20 when the flag has reached its fully raised display position on the flagpole, thereby de-energizing the motor 30 by opening its supply circuit. This occurs when the actuating lug 80 engages a movable arm 82 of said microswitch when said actuating lug moves down through a halyard guiding means 84, as shown in FIGS. 2–4.

If, however, the flag becomes entangled with the halyard or the flagpole or other obstacle while it is being raised to its display position, as can occur when it is being raised out of the storage compartment, the present invention will cause the motor to reverse its direction so as to rotate in a counterclockwise direction, as viewed in FIG. 2, thereby lowering the flag back into its storage compartment. After a suitable time delay, this invention will then cause the motor to rotate in its original clockwise direction to again raise the flag, in the following manner. Whenever the flag becomes entangled or obstructed in being raised by operation of motor 30, said motor will become overloaded and draw an abnormally large amount of electric current which passes through current-sensitive heater means 48 of current-sensing switching device 52 which will cause said current-sensitive heater means 48 to become heated. This heating will cause movable contact 50 of current-sensing switching device 52 to move from contact 86 to contact 88 of said current-sensing switching device with the result that electric current will flow through movable contact 50, through conductor 90, movable contact 92 of a similar current-sensing switching device 94, conductor 96, coil 98 of electromagnetic relay 60 and conductor 36 so as to activate said electromagnetic relay 60 to close the normally open contacts 100 and 102, and 106 and 108, and open the normally closed contacts 72 and 74, and 62 and 64. This operation will cause the motor to reverse its direction of clockwise rotation by completing the motor supply circuit of conductor 46, current-sensitive heater means 112 of current-sensing switching device 94, conductor 114, closed lower limit microswitch 116, movable relay contact 104 now bridging relay contacts 100 and 102, conductor 118, conductor 68, conductor 66, conductor 120, movable relay contact 110 now bridging contacts 106 and 108, conductor 112, motor protector device 78, and conductor 36. The motor will operate in such reverse direction until the lower-limit microswitch 116 is opened when an actuating lug 124 (FIG. 2) adjustably carried on halyard 20 engages a movable arm 126 of said microswitch when said actuating lug moves down through halyard guiding means 128, or when the current-sensitive conductor means 48 has sufficiently cooled. When a suitable time period has passed, during which time current-sensitive conductor means 48 has become sufficiently cooled, movable contact 50 will move away from contact 88 and back to contact 86, its normal position in current-sensing device 52, and the motor will then resume its original clockwise direction of rotation, as described earlier, until the upper-limit microswitch 56 opens when the flag reaches its display position on the flagpole as aforesaid. This reversing cycle will be repeated until the obstruction is successfully removed or overcome or the flag becomes sufficiently jammed that the motor is unable to rotate in either direction, in which case the supply circuit will be opened by operation of motor protector device 78.

Closing line switch 40 with selector switch 42 in the "lower" position, or with said selector switch in the "automatic" position and the photoelectric cell 44 operating to lower the flag, will cause the motor to rotate in a counterclockwise direction as viewed in FIG. 2, by energizing conductor 90, movable contact 92 of current-sensing switching device 94, the movable contact conductor 96, coil 98 of electromagnetic relay 60 to close the normally open contacts 100 and 102, and 106 and 108, and open the normally closed contacts 72 and 74, and 62 and 64. This relay operation will complete the motor supply circuit consisting of conductor 46, current sensitive heater means heater 112 of current-sensing switching device 94, conductor 114, closed lower-limit microswitch 116, movable relay contact 104 now bridging relay contacts 100 and 102, conductor 118, conductor 68, conductor 66, conductor 120, movable relay contact 110 now bridging contacts 106 and 108, conductor 122, motor protector device 78, and conductor 36 until lower-limit microswitch 116 opens by engagement with actuating lug 124 carried on halyard 20 when the flag reaches its lower limit of travel as aforesaid.

Similarly, if the flag becomes entangled with the flagpole or the halyard or other obstacle while it is being lowered, which can frequently occur when the flag is passing through furling and guiding means 18 while entering its protective storage compartment, especially during freezing weather when the wet flag freezes in a rigid condition, the present invention will cause the motor to reverse its counterclockwise direction of rotation as viewed in FIG. 2, thereby raising the flag back toward the peak of the flagpole. After a suitable time delay, this invention will then cause the motor to rotate in its original counterclockwise direction of motion of again lower the flag into the storage compartment, in the following manner. Whenever the flag becomes entangled or obstructed in being lowered by operation of motor 30, said motor will become overloaded and draw an abnormally large amount of electric current which passes through current-sensitive heater means 112 of current-sensing switching device 94 which will cause said current-sensitive heater means to become heated. This heating will cause movable contact 92 of current-sensing switching device 94 to move from contact 130 to contact 132 of said current-sensing device so that the current supply to the coil 98 of electromagnetic relay 60 will be opened with the result that contacts 100 and 102, and 106 and 108 will be restored to their normally open positions and contacts 72 and 74, and 62 and 64 will be restored to their normally closed positions. This operation will cause the motor to reverse its counterclockwise direction of rotation by completing the motor supply circuit of conductor 46, current-sensitive heater means 48 and movable contact 50 of current-sensing switching device 52, conductor 54, closed upper-limit microswitch 56, movable relay contact 58 now bridging relay contacts 62 and 64, conductor 66, conductor 68, movable relay contact 70 now bridging contacts 72 and 74, conductor 76, motor protector device 78, and conductor 36 until the upper-limit microswitch 56 is opened by engagement with actuating lug 80 carried on the halyard when the flag reaches it upper limit of travel as aforesaid or when current-sensitive conductor means 112 has sufficiently cooled. When a suitable time period has passed, during which time current-sensitive conductor means 112 has become sufficiently cooled, the movable contact means 92 will move away from contact 132 and back to contact 130 of current-sensing switching device 94, its normal position, and the motor will then resume its original counterclockwise direction of rotation, as described earlier, until the lower-limit microswitch 116 opens by engagement with actuating lug 124 when the flag reaches its lower limit of travel as aforesaid. This reversing cycle will be repeated until the obstruction is successfully removed or overcome or the flag becomes sufficiently jammed that the motor is unable to rotate in either direction, in which case the supply circuit will be opened by operation of motor protector device.

If, in the foregoing situations, obstruction to the free movement of the flag and halyard is not removed or overcome, the cycles of reversal will continue indefinitely unless the flag becomes sufficiently jammed that the motor is unable to rotate in either direction with the result that the motor protective device will operate to shut off the motor by breaking the motor supply circuit, in which case human assistance will be required to remove the obstruction to the movement of the flag and halyard and restart the motor. It has been experienced, however, that such obstruction can usually be removed or overcome within one reversing cycle during which period outside natural forces such as wind and gravity frequently eliminate the entanglement or other condition causing the obstruction, thereby eliminating in most cases the need for human assistance required to remove the obstruction and restart the motor.

I claim:

1. A control system for periodically reversing the direction of rotation of an electric motor and restoring the original direction of rotation thereof after predetermined time delay in response to mechanical overload of means driven thereby comprising: electromagnetic relay means, two microswitch means, and two thermally responsive current-sensing switching devices, all in circuit with said motor and a source of electrical energy; said relay means comprising plural contacts connected in said circuit to cause said motor to rotate in either of two directions corresponding, respectively, to the energized and de-energized condition of said relay means; each said microswitch means being operable to isolate said motor from said source of energy in response to predetermined movement of the driven means, each said thermally responsive device comprising a current-sensitive heater means and a movable contact operably responsive thereto, said heater means thereof being in series circuit with an associated one of said microswitch means; whereby each said switching device is operated by its respective heater means in response to overload-induced excessive current in said circuit thereby to temporarily actuate said relay means from one to the other of its said energized and deenergized conditions and reverse said motor, until said associated one microswitch means operates to isolate said motor or said switching devive returns to its original circuit position, after a predetermined time delay in response to cooling of its heater means, whichever occurs first, restoration of said switching device to its original circuit position causing actuation of said relay means to the other of its said conditions to automatically restore the motor's original direction of rotation.

2. The invention of claim 1, and a motor protector device in circuit with said motor to isolate the same from said source of energy, whereby the reversing cycle is repeated until the overload of the driven mean is overcome, or until said protector device operates to isolate said motor.

3. A system for controlling a reversible electric motor drivingly coupled with a flag-carrying halyard in an automatic flagpole assembly, the systemy being operable to automatically reverse the direction of rotation of the motor in response to an obstruction to the free operational movement of the halyard and to restore the original direction of rotation of the motor after predetermined time delay comprising: electromagnetic relay means, two microswitch means, and two thermally responsive current-sensing switching devices, all in circuit with said motor and a source of electrical energy; said relay means comprising plural contacts connected in said circuit to cause said motor to rotate in either of two directions corresponding, respectively, to the energized and deenergized condition of said relay means; each said microswitch means being operable to isolate said motor from said source of energy in response to predetermined movement of the driven means, each said thermally responsive device comprising a current-sensitive heater means and a movable contact operably responsive thereto, said heater means thereof being in series circuit with an associated one of said microswitch means; whereby each said switching device is operated by its respective heater means in response to overload-induced excessive current in said circuit thereby to temporarily actuate said relay means from one to the other of its said energized and deenergized conditions, and reverse said motor, until said associated one microswitch means operates to isolate said motor or said switching device returns to its original circuit position, after a predetermined time delay in response to cooling of its heater means, whichever occurs first, restoration of said switching device to its original circuit position causing actuation of said relay means to the other of its said conditions to automatically restore the motor's original direction of rotation.

4. The invention according to claim 3, and a motor protector device in circuit with said motor to isolate the same from said source of energy, whereby the reversing cycle is repeated until the overload of the driven means is overcome, or until said protector device operates to isolate said motor.

5. The invention according to claim 3, and a pair of actuating lugs carried on the halyard, each of which operatively engages an associated one of said microswitch means.

* * * * *